| United States Patent [19] | [11] Patent Number: 4,968,504 |
| --- | --- |
| Rourke | [45] Date of Patent: Nov. 6, 1990 |

[54] RECOVERY OF SCANDIUM AND URANIUM

[75] Inventor: William J. Rourke, Worcester, Mass.

[73] Assignee: GTE Laboratories Incorporated, Waltham, Mass.

[21] Appl. No.: 424,027

[22] Filed: Oct. 19, 1989

[51] Int. Cl.$^5$ ............................................. C01G 57/00
[52] U.S. Cl. .......................................... 423/7; 423/20; 423/8; 423/11; 423/18; 423/21.5; 423/DIG. 14; 210/682
[58] Field of Search ...................... 423/7, 8, 11, 18, 20, 423/21.5, DIG. 14; 210/682

[56] References Cited

U.S. PATENT DOCUMENTS

| 4,383,104 | 7/1983 | Miyake et al. | 423/21.5 |
| 4,414,183 | 11/1983 | Sasaki et al. | 423/7 |
| 4,576,969 | 3/1986 | Echigo et al. | 521/28 |
| 4,624,703 | 11/1986 | Vanderpool et al. | 75/101 R |
| 4,626,280 | 12/1986 | Vanderpool et al. | 75/101 R |
| 4,718,995 | 1/1988 | Vanderpool et al. | 204/112 |
| 4,718,996 | 1/1988 | Vanderpool et al. | 204/112 |
| 4,751,061 | 6/1988 | Kim et al. | 423/21.5 |
| 4,765,909 | 8/1988 | Rourke et al. | 210/672 |
| 4,786,481 | 11/1988 | Kataoka et al. | 423/7 |
| 4,797,264 | 1/1989 | Inoue et al. | 423/7 |
| 4,808,384 | 2/1989 | Vanderpool et al. | 423/21.1 |
| 4,816,233 | 3/1989 | Rourke et al. | 423/21.5 |

OTHER PUBLICATIONS

Ross, J. R., "Reconnaissance of Scandium Sources and Recovery of Scandium from Uranium Mill Solutions", Jan. 1962, Bur. of Mines, Utah.

Ross, J. R., "Recovery of Scandium from Uranium Plant Iron Sludge and from Woljramite Concentrates", May 1964, Bur. of Mines, Utah.

*Primary Examiner*—Edward A. Miller
*Assistant Examiner*—Ngoclan T. Mai
*Attorney, Agent, or Firm*—Carl F. Ruoff

[57] ABSTRACT

The separation of uranium, iron and scandium is achieved by the following process wherein a material containing these values is dissolved in mineral acid to form an aqueous solution, thereafter, an iminodiacetic acid cationic ion exchange resin is used to retain a major portion of the scandium and uranium. A raffinate containing the iron is formed. The ion exchange resin having said scandium and uranium retained thereon is rinsed with a dilute acid to remove residual metals other than scandium and uranium. The resin is eluted with an aqueous solution of an organic chelating acid to remove a major portion of the scandium from said resin and to form an aqueous solution containing scandium. The resin is then eluted with an aqueous solution of a mineral acid to remove a major portion of the uranium from the resin to form an aqueous solution containing the uranium. The scandium and uranium are recovered as solids.

10 Claims, No Drawings

RECOVERY OF SCANDIUM AND URANIUM

FIELD OF THE INVENTION

This invention relates to a method of recovering scandium and uranium from the tailings produced by the uranium processing industry.

BACKGROUND OF THE INVENTION

The uranium processing industry gives rise to tailings which contain fairly high concentrations, on the order of 1%, of the rare metal scandium. In addition to a comparable amount of uranium, there are other components present that have lower economic values such as iron.

A process that provides for the efficient recovery of the uranium at the same time as the scandium would be an advancement in the art. In this way the metal values recovered are increased at the same time that the objections to subsequent disposal of the material are reduced.

A process that provides for recovering the uranium and scandium separated from one another rather than mixed together would also be an advancement in the art. U.S. Pat. No. 4,816,233 issued March 28, 1989, and assigned to the same assignee as the present application discloses a process for separating trace amounts of scandium from ore processing waste via an ion exchange process. U.S. Pat. No. 4,816,233 and the disclosure thereof are incorporated by reference herein. The present invention is a modification of the process disclosed in the above-mentioned patent that enables both the uranium and

SUMMARY OF THE INVENTION

In accordance with one aspect of the present invention, there is provided a process comprising, a) dissolving a material containing metal values comprising uranium, scandium and iron and optionally other metals in aqueous mineral acid to form an aqueous solution containing the metal values, b) adjusting the pH of the the aqueous solution from about 1 to about 2 by the addition of sufficient alkali metal base to form a first pH adjusted solution, c) adding a sufficient amount of an iron reducing agent to convert any trivalent iron present in the first pH adjusted solution to divalent iron, d) adjusting the pH of the resulting solution that is depleted of trivalent iron to about 1.9 to about 2.1 to form a second pH adjusted solution, e) contacting an iminodiacetic acid cationic ion exchange resin with the second pH adjusted solution to retain a major portion of the scandium and uranium on the resin and to form a raffinate containing a major portion of the iron and a major portion of the other metal values present, f) rinsing the ion exchange resin having the scandium and uranium retained thereon with a dilute acid having a pH of from about 1.9 to about 2.1 to remove metals other than the scandium and the uranium without removing the scandium and the uranium, g) eluting the resin with an aqueous solution of an organic chelating acid to remove a major portion of the scandium from the resin and to form an aqueous solution containing the scandium, h) thereafter eluting the resin with an aqueous solution of a mineral acid to remove a major portion of the uranium from the resin and to form an aqueous solution containing the uranium, i) adding a sufficient amount of an aqueous solution of an alkali metal base to convert essentially all of the scandium in the aqueous solution containing the scandium to form a solid material containing the scandium and a first aqueous phase essentially free of metal values, j) separating the solid material containing the scandium and the first aqueous phase, k) adding a sufficient amount of an alkali metal base to convert essentially all of the uranium in the aqueous solution containing the uranium to a solid material containing the uranium and a second aqueous phase essentially free of metal values, and l) separating the solid material containing the uranium and the second aqueous phase.

In another aspect of this invention there is provided, a process in accordance with the above-described process of this invention wherein the reducing agent is selected from the group consisting of iron powder, sulfur dioxide, and mixtures thereof.

In an additional aspect of this invention there is provided, in accordance with the above-described process of this invention, a process wherein the reducing agent is iron powder.

In another aspect of this invention there is provided, in accordance with the above-described process of this invention, a process wherein the mineral acid is hydrochloric acid.

In still another aspect of this invention there is provided, in accordance with the above-described process of this invention, a process wherein the chelating agent is selected from the group consisting of diglycolic acid, carboxylic acids, ethylenediaminetetraacetic acid and mixtures thereof.

In still an additional aspect of this invention there is provided, in accordance with the above-described process of this invention, a process wherein the uranium is eluted from the resin with hydrochloric acid.

DETAILED DESCRIPTION

For a better understanding of the present invention, together with other and further objects, advantages and capabilities thereof reference is made to the following disclosure and appended claims in connection with the above description of some of the aspects of the invention.

The uranium processing tailings are dissolved in a mineral acid. While any mineral acid such as sulfuric, nitric, hydrochloric and the like can be used, it is preferred to use hydrochloric acid. Hydrochloric acid having a concentration of about 50% is the especially preferred mineral acid.

After the tailings are dissolved in the mineral acid, a pH of from about 1 to about 2 is maintained. A base such as an alkali metal hydroxide is used to neutralize a sufficient amount of the acid to achieve the desired pH range. Sodium hydroxide is the preferred base.

While any reductant that will convert trivalent iron to divalent iron can be used to reduce any trivalent iron to divalent iron metallic iron powder is the preferred iron reducing agent.

The ion exchange resin that is used has iminodiacetic acid as its functional group. It selectively removes scandium and uranium and while retaining those metal values, such values can be selectively eluted from the resin. The resin is first rinsed with a dilute mineral acid, such as hydrochloric acid at a pH of from about 1.9 to about 2.1, to remove any other metal values that are retained on the resin without removing the retained scandium and uranium. The ion exchange resin is thereafter eluted with an aqueous solution of a chelating agent preferably selected from the group consisting of diglycolic acid, carboxylic acids, ethylenediaminetetraacetic acid and mixtures thereof to selectively remove the scandium from the resin. The scandium is precipitated from the elution solution by the addition of a sufficient amount of an alkali metal base preferably sodium hydroxide, to thereby form a solid scandium compound.

The uranium is eluted from the resin by a mineral acid such as hydrochloric acid, having a concentration of from about 5% to about 10%. The acid solution containing the uranium is thereafter treated with a base such as sodium hydroxide to precipitate a solid uranium compound from the remaining aqueous phase that is essentially free of uranium ions.

The implementation of this invention is demonstrated by the example below. This example is not to be viewed as limiting the scope of the invention but merely illustrative of its features. Unless otherwise stated the proportions, percentages and parts are by weight.

EXAMPLE

A solution containing about 1000 ppm U in 2% $HNO_3$ is carefully adjusted to a pH of 2.0 with 1M NaOH solution. The resulting uranium solution is fed slowly through an ion exchange column filled with an iminodiacetic acid chelating resin in the hydrogen form. When the last of the uranium solution is passed into the resin bed, elution is initiated with a rinsing acid, dilute $H_2SO_4$ with a pH of about 2.0. A total of 90 fractions were collected overnight. These fractions are analyzed for uranium by DC Plasma Atomic Emisison Spectrometry. No uranium is found in the column effluent (method detectability <0.1 ppm of U) showing that uranium is strongly retained by the resin under the usual collection conditions.

The ion exchange column with the retained uranium is eluted with 0.05 M solution of diglycolic acid. A total of 100 fractions are collected and these are assayed for uranium by DCP. The results are shown in Table 1.

These results show that under conditions which result in complete elution of scandium, uranium is either not eluted at all or only in trace amounts.

TABLE I

| Elution of Uranium Loaded Resin with Diglycolic Acid | |
|---|---|
| FRACTION | URANIUM |
| 5 | <0.1 ppm |
| 10 | 0.145 ppm |
| 15 | 0.046 ppm |
| 20 | 0.597 ppm |
| 25 | 0.208 ppm |
| 30 | 0.399 ppm |
| 35 | 0.364 ppm |
| 40 | 0.245 ppm |
| 45 | 0.320 ppm |
| 50 | 0.221 ppm |
| 55 | 0.190 ppm |
| 60 | 0.160 ppm |
| 65 | 0.037 ppm |
| 70 | 0.060 ppm |
| 75 | 0.470 ppm |
| 80 | 0.445 ppm |
| 85 | 0.385 ppm |
| 90 | 0.283 ppm |
| 95 | 0.334 ppm |
| 100 | 0.368 ppm |

The column is eluted with 1 M HCl after the diglycolic acid elution. Again, the eluate is collected as a series of fractions which are analyzed for uranium. The results are shown in Table II.

These results show clearly that uranium adsorbed by the resin is eluted readily with HCl. This mean the uranium will not be irrevocably building up on the resin.

TABLE II

| Elution of Uranium with 1M HCl | |
|---|---|
| FRACTION | URANIUM |
| 2 | 0.594 ppm |
| 3 | 0.736 ppm |
| 4 | 50.3 ppm |
| 5 | 98.2 ppm |
| 6 | 56.9 ppm |
| 7 | 25.3 ppm |
| 8 | 10.1 ppm |
| 9 | 4.06 ppm |
| 10 | 1.97 ppm |
| 11 | 0.893 ppm |

While there has been shown and described what are at present considered the preferred embodiments of the invention, it will be obvious to those skilled in the art that various changes and modifications may be made therein without departing from the scope of the invention as defined by the appended claims.

What is claimed is:

1. A process comprising,
   (a) dissolving a material containing metal values comprising uranium, scandium and iron and optionally other metals in aqueous mineral acid to form an aqueous solution containing said metal values,
   (b) adjusting the pH of the said aqueous solution from about 1 to about 2 by the addition of sufficient alkali metal base to form a first pH adjusted solution,
   (c) adding a sufficient amount of an iron reducing agent to convert any trivalent iron present in said first pH adjusted solution to divalent iron,
   (d) adjusting the pH of the resulting solution that is depleted of trivalent iron to about 1.9 to about 2.1 to form a second pH adjusted solution,
   (e) contacting an iminodiacetic acid cationic ion exchange resin with said second pH adjusted solution to retain a major portion of the scandium and uranium on said resin and to form a raffinate containing a major portion of the iron and a major portion of the other metal values present,
   (f) rinsing said ion exchange resin having said scandium and uranium retained thereon with a dilute acid having a pH of from about 1.9 to about 2.1 to remove metals other than said scandium and said uranium without removing said scandium and said uranium,
   (g) eluting said resin with an aqueous solution of an organic chelating acid to remove a major portion of the scandium from said resin and to form an aqueous solution containing said scandium,
   (h) thereafter eluting said resin with an aqueous solution of a mineral acid to remove a major portion of the uranium from said resin and to form an aqueous solution containing said uranium,
   (i) adding a sufficient amount of an aqueous solution of an alkali metal base to convert essentially all of the scandium in said aqueous solution containing said scandium to form a solid material containing said scandium and a first aqueous phase essentially free of metal values,
   (j) separating said solid material containing said scandium and said first aqueous phase,
   (k) adding a sufficient amount of an alkali metal base to convert essentially all of the uranium in the aqueous solution containing said uranium to a solid material containing said uranium and a second aqueous phase essentially free of metal values, (l) separating said solid material containing said uranium and said second aqueous phase.

2. A process according to claim 1 wherein said reducing agent is selected from the group consisting of iron powder, sulfur dioxide, and mixtures thereof.

3. A process according to claim 1 wherein said reducing agent is iron powder.

4. A process according to claim 1 wherein said mineral acid is hydrochloric acid.

5. A process according to claim 4 wherein the hydrochloric acid has a normality of from about 0.5 to about 6.

6. A process according to claim 1 wherein hydrochloric acid is used to adjust the pH of the solution in step d.

7. A process according to claim 1 wherein said chelating agent is selected from the group consisting of diglycolic acid, carboxylic acids, ethylenediaminetetraacetic acid and mixtures thereof.

8. A process according to claim 7 wherein said chelating agent is diglycolic acid.

9. A process according to claim 1 wherein said uranium is eluted from said resin with hydrochloric acid.

10. A process according to claim 9 wherein the hydrochloric acid has a concentration of from about 0.5 to about 2 molar.

* * * * *